United States Patent [19]
Shibata et al.

[11] Patent Number: 6,071,186
[45] Date of Patent: Jun. 6, 2000

[54] DEVICE FOR SUSPENDING A CHAIN OF LINKED FOOD PRODUCTS SUCH AS SAUSAGES, AND APPARATUS FOR MANUFACTURING A CHAIN OF SUCH LINKED FOOD PRODUCTS HAVING THE SUSPENDING DEVICE

[75] Inventors: Chiyoji Shibata; Hideaki Arai; Katsuya Tanabe, all of Yokohama, Japan

[73] Assignee: Hitec Co. Ltd., Tokyo, Japan

[21] Appl. No.: 09/083,279

[22] Filed: May 22, 1998

[30] Foreign Application Priority Data

May 26, 1997 [JP] Japan .................................. 9-151534

[51] Int. Cl.⁷ .................................................. A22C 11/00
[52] U.S. Cl. .............................................. 452/51; 452/182
[58] Field of Search ........................................ 452/51, 182

[56] References Cited

U.S. PATENT DOCUMENTS

| | | |
|---|---|---|
| 3,115,668 | 12/1963 | Townsend . |
| 3,191,222 | 6/1965 | Townsend . |
| 3,694,853 | 10/1972 | Greider . |
| 3,971,101 | 7/1976 | Townsend et al. .................. 452/51 |
| 4,539,796 | 9/1985 | Nakamura et al. .................. 452/51 |
| 5,092,813 | 3/1992 | Kasai et al. ........................ 452/51 |
| 5,092,814 | 3/1992 | Kasai et al. . |
| 5,183,433 | 2/1993 | Townsend et al. . |
| 5,197,915 | 3/1993 | Nakamura et al. . |
| 5,730,649 | 3/1998 | Schliesser et al. .................. 452/51 |

FOREIGN PATENT DOCUMENTS

| | | |
|---|---|---|
| 40-27509 | 12/1965 | Japan . |
| 41-5899 | 3/1966 | Japan . |
| 2-269618 | 11/1990 | Japan . |
| 5-146248 | 6/1993 | Japan . |
| 5-227874 | 9/1993 | Japan . |
| WO 96/05733 | 2/1996 | WIPO . |

OTHER PUBLICATIONS

"Townsend's SC 14 Conveyor" catalog.
"NL Series by Townsend" catalog.

*Primary Examiner*—Willis Little
*Attorney, Agent, or Firm*—Nixon & Vanderhye

[57] ABSTRACT

A suspending device is provided with a device frame; a guiding device provided on an upper portion of the device frame and having a guide tube for guiding given portions of a chain of sausages, which are being conveyed and supplied by a nipping and conveying device, to a predetermined position while circularly moving its free end; a conveying device provided on the upper portion of the device frame in the same way as the guiding device, and adapted to convey the sausages formed into loops as the given portions of the sausages guided to the predetermined position by the guide tube of the guiding device are caught by the conveying device; a power generating device provided on the upper portion of the device frame and adapted to generate power constituting a conveying force for the sausages in the conveying device as well as a circularly moving force for circularly moving the guide tube of the guiding device; and a power transmitting device for transmitting the power generated by the power generating device to the guide tube and the conveying device as the circularly moving force for the free end of the guide tube and the conveying force of the conveying device.

18 Claims, 11 Drawing Sheets

DEVICE FOR SUSPENDING A CHAIN OF LINKED FOOD PRODUCTS SUCH AS SAUSAGES, AND APPARATUS FOR MANUFACTURING A CHAIN OF SUCH LINKED FOOD PRODUCTS HAVING THE SUSPENDING DEVICE

BACKGROUND OF THE INVENTION

1. Field of the Invention

The present invention relates to a suspending device for suspending a chain of linked food products such as sausages with a meat emulsion or the like stuffed in a casing and to an apparatus for manufacturing a chain of linked food products such as sausages having the suspending device.

2. Description of the Related Art

Conventionally, as disclosed in Japanese Patent Application Publication No. 5899/1966, U.S. Pat. No. 3,694,853, and Japanese Patent Application Laid-Open Nos.146248/1993 and 227874/1993, this type of apparatus for manufacturing a chain of linked food products is generally comprised of a stuffing device for stuffing a raw material for linked food products into a tubular casing; a linking device for forming the casing from the stuffing device and stuffed with the raw material for linked food products into a chain of linked food products and for conveying the same; and a suspending device for suspending the chain of linked food products conveyed by the linking device and supplied thereto.

In the manufacturing apparatuses disclosed in Japanese Patent Application Publication No. 5899/1966 and U.S. Pat. No. 3,694,853, the stuffing device, the linking device, and the suspending device are driven by one electric motor. For this reason, the rotating force from the electric motor is transmitted to the respective devices by means of pulleys, belts, sprocket wheels, and endless chains respectively trained between the sprocket wheels.

Meanwhile, with the manufacturing apparatus disclosed in Japanese Patent Application Laid-Open No.146248/1993, the linking device and the suspending device are respectively provided with electric motors, and the operation of the electric motor of the suspending device is controlled on the basis of the amount of conveyance of the linked food products by the linking device.

In the same way as the manufacturing apparatus disclosed in Japanese Patent Application Laid-Open No. 227874/1993, each of the manufacturing apparatuses disclosed in the above-described publications is arranged such that a driving source such as an electric motor and the like is disposed below an apparatus frame, and a rotatively driving shaft for transmitting power from this driving source to a guiding means and a hooking and conveying means of the suspending device is arranged vertically so as to transmit the rotatively driving force from below to the guiding means and the hooking and conveying means disposed above the apparatus frame.

Since raw materials such as meat emulsions or the like are handled in the manufacturing apparatuses of this type, if the manufacturing apparatus is provided with the rotatively driving shaft which rises from below to above, the raw materials such as the meat emulsions or the like are easily attached to the rotatively driving shaft, a bearing for rotatably supporting the same, and the sprocket wheels and the like attached to the rotatively driving shaft, and constantly contaminate them due to the unintended rupture or the like of the casings or the like. Therefore, since food products are handled, the rotatively driving shaft and other parts must also be cleaned frequently.

In addition, as in the case of the manufacturing apparatus disclosed in Japanese Patent Application Laid-Open No.146248/1993, even if the electric motor of the suspending device is disposed in a casing, the casing must be constructed with very high water tightness so that cleaning water and the like will not enter the casing, constituting a factor for higher cost.

SUMMARY OF THE INVENTION

In view of the above-described circumstances, it is an object of the present invention to provide a suspending device for suspending a chain of linked food products such as sausages and an apparatus for manufacturing a chain of linked food products such as sausages having the suspending device, which make it possible to reduce chances of contamination of the driving shaft and the like by the raw material for linked food products and to effect cleaning very easily by simplifying the driving mechanism.

To this end, in accordance with the present invention, there is provided a suspending device for suspending a chain of linked food products such as sausages, comprising: a device frame; guiding means provided on an upper portion of the device frame and having a guide member for guiding given portions of a chain of linked food products such as sausages, which are being supplied, to a predetermined position while circularly moving a free end thereof; conveying means provided on the upper portion of the device frame, and adapted to convey the chain of linked food products such as sausages formed into loops as the given portions of the chain of linked food products such as sausages guided to the predetermined position by the guide member of the guiding means are caught by the conveying means; power generating means provided on the upper portion of the device frame and adapted to generate power constituting a conveying force for the chain of linked food products such as sausages in the conveying means as well as a circularly moving force for circularly moving the guide member of the guiding means; and power transmitting means provided on the upper portion of the device frame and adapted to transmit the power generated by the power generating means to the guide member and the conveying means as the circularly moving force for the free end of the guide member and the conveying force of the conveying means, wherein the conveying means is provided with a plurality of hooks whereby the given portions of the chain of linked food products such as sausages are caught, and an endless member to which the hooks are attached and which is capable of traveling so as to convey the chain of linked food products such as sausages caught by the hooks, and wherein the power transmitting means is provided with a first rotating horizontal shaft connected to the guide member and disposed rotatably on the upper portion of the device frame so as to transmit the power from the power generating means to the guide member and circularly move the free end of the guide member, a second rotating horizontal shaft connected to the endless member and disposed rotatably on the upper portion of the device frame so as to transmit the power from the power generating means to the endless member and cause the endless member to travel, and a wrapping connector mechanism for synchronously rotating the first and the second rotating horizontal shafts.

In the suspending device of the present invention, the first rotating horizontal shaft may have an input horizontal shaft and an output horizontal shaft, and the power transmitting means may have a speed change gear interposed between the input horizontal shaft and the output horizontal shaft. Alternatively, the second rotating horizontal shaft may similarly have an input horizontal shaft and an output horizontal shaft, and the power transmitting means may have a speed change gear interposed between the input horizontal shaft and the output horizontal shaft of the second rotating horizontal shaft. The speed change ratio of the speed change gear is determined by the number of circular movements of the guide member and the amount of movement of the hook, and is specifically determined such that the hook is moved one pitch each time the guide member undergoes one circular movement. Accordingly, the speed change gear may be either a speed increasing gear or a speed reducing gear. In a preferred example, the speed increasing gear is used as the speed change gear between the input horizontal shaft and the output horizontal shaft of the first rotating horizontal shaft, while the speed reducing gear is used as the speed change gear between the input horizontal shaft and the output horizontal shaft of the second rotating horizontal shaft. As a preferred specific example of the speed change gear, it is possible to cite a planetary gear mechanism, but other gear mechanisms may be used.

In the suspending device of the present invention, the power generating means is provided with an electric motor, an output rotating shaft of the electric motor being disposed in such a manner as to extend in a direction which intersects the first rotating horizontal shaft, and wherein the power transmitting means is provided with a third rotating horizontal shaft juxtaposed to the first rotating horizontal shaft and disposed rotatably as well as a gear mechanism interposed between the third rotating horizontal shaft and the output rotating shaft of the electric motor so as to transmit the rotation of the output rotating shaft of the electric motor to the third rotating horizontal shaft. In such a suspending device, since the longitudinal axis of the electric motor can be arranged in parallel to the traveling direction of the endless member of the conveying means, the amount of projection of the electric motor itself from the device frame can be made small, with the result that the width of the device can be made small.

In addition, instead of the above-described arrangement, the output rotating shaft of the electric motor may be disposed concentrically with or juxtaposed to the first or the second rotating horizontal shaft.

The wrapping connector mechanism is provided with a first wheel mounted on the first rotating horizontal shaft, a second wheel mounted on the second rotating horizontal shaft, and an endless member trained between the first and the second wheels. In a preferred example, the first and the second wheels are both arranged in a substantially identical plane, specifically in an identical vertical plane. As the first and the second wheels, a toothed wheel or a sprocket wheel is used to eliminate slippage with respect to the endless member. As the endless member, a toothed endless belt or an endless chain is used correspondingly. In a case where such a toothed wheel or sprocket wheel is used, the diameter ratio or the number-of-teeth ratio between the first and the second wheels may be one to one. However, if the first and the second wheels are to be provided with a function equivalent to that of the aforementioned speed change gear, the diameter ratio or the number-of-teeth ratio between the first and the second wheels is determined by the number of circular movements of the guide member and the amount of movement of the hook, and is specifically determined such that the hook is moved one pitch each time the guide member undergoes one circular movement.

In addition to the first and the second wheels, the wrapping connector mechanism may be further provided with direction-changing wheels constituted by toothed wheels or sprocket wheels so that the engagement of the endless member with the first and the second wheels can be effected reliably.

In addition, in accordance with the present invention, there is provided an apparatus for manufacturing a chain of linked food products such as sausages, comprising: stuffing means for stuffing a raw material for linked food products such as sausages into a tubular casing; linking means for forming the casing from the stuffing means and stuffed with the raw material for linked food products such as sausages into a chain of linked food products such as sausages via twisted portions and for conveying the linked food products such as sausages; the above-described suspending device for suspending the chain of linked food products such as sausages being conveyed and supplied by the linking means; detecting means for detecting an amount of the chain of linked food products such as sausages being conveyed and supplied to the suspending device; and controlling means for controlling a power generating means on the basis of a detection signal from the detecting means.

In the manufacturing apparatus in accordance with the present invention, the controlling means controls the power generating means on the basis of the detection signal from the detecting means such that predetermined portions of the chain of linked food products such as sausages for constituting predetermined numbers of links, respectively, are consecutively caught by hooks of the conveying means.

In the present invention, the stuffing means is provided with stuffing pump means for discharging the raw material for linked food products such as sausages and first driving means for driving the stuffing pump means, and wherein the linking means is provided with rotation imparting means for imparting rotation to the casing stuffed with the raw material for linked food products such as sausages, second driving means for driving the rotation imparting means, nipping and conveying means for nipping the casing stuffed with the raw material for linked food products such as sausages to form twisted portions in the stuffed casing in cooperation with the rotation imparting means, and for conveying the chain of linked food products such as sausages linked via the twisted portions, and third driving means for driving the nipping and conveying means, the first, the second, and the third driving means being provided independently of the power generating means.

As described above, in accordance with the present invention, the power transmitting means is provided with the first rotating horizontal shaft connected to the guide member and disposed rotatably on the upper portion of the device frame so as to transmit the power from the power generating means to the guide member and circularly move the free end of the guide member, the second rotating horizontal shaft connected to the endless member and disposed rotatably on the upper portion of the device frame so as to transmit the power from the power generating means to the endless member and cause the endless member to travel, and the wrapping connector mechanism for synchronously rotating the first and the second rotating horizontal shafts. Accordingly, it is possible to provide a suspending device which is capable of reducing chances of contamination of the driving shaft and the like by the raw material for linked food products and of effecting cleaning very easily and which has a simplified arrangement, as well as an apparatus for manufacturing a chain of linked food products such as sausages having the suspending device.

The above and other objects, features and advantages of the present invention will become more apparent from the following detailed description of the invention when read in conjunction with the accompanying drawings.

DESCRIPTION OF THE PREFERRED EMBODIMENTS

Figure 1:
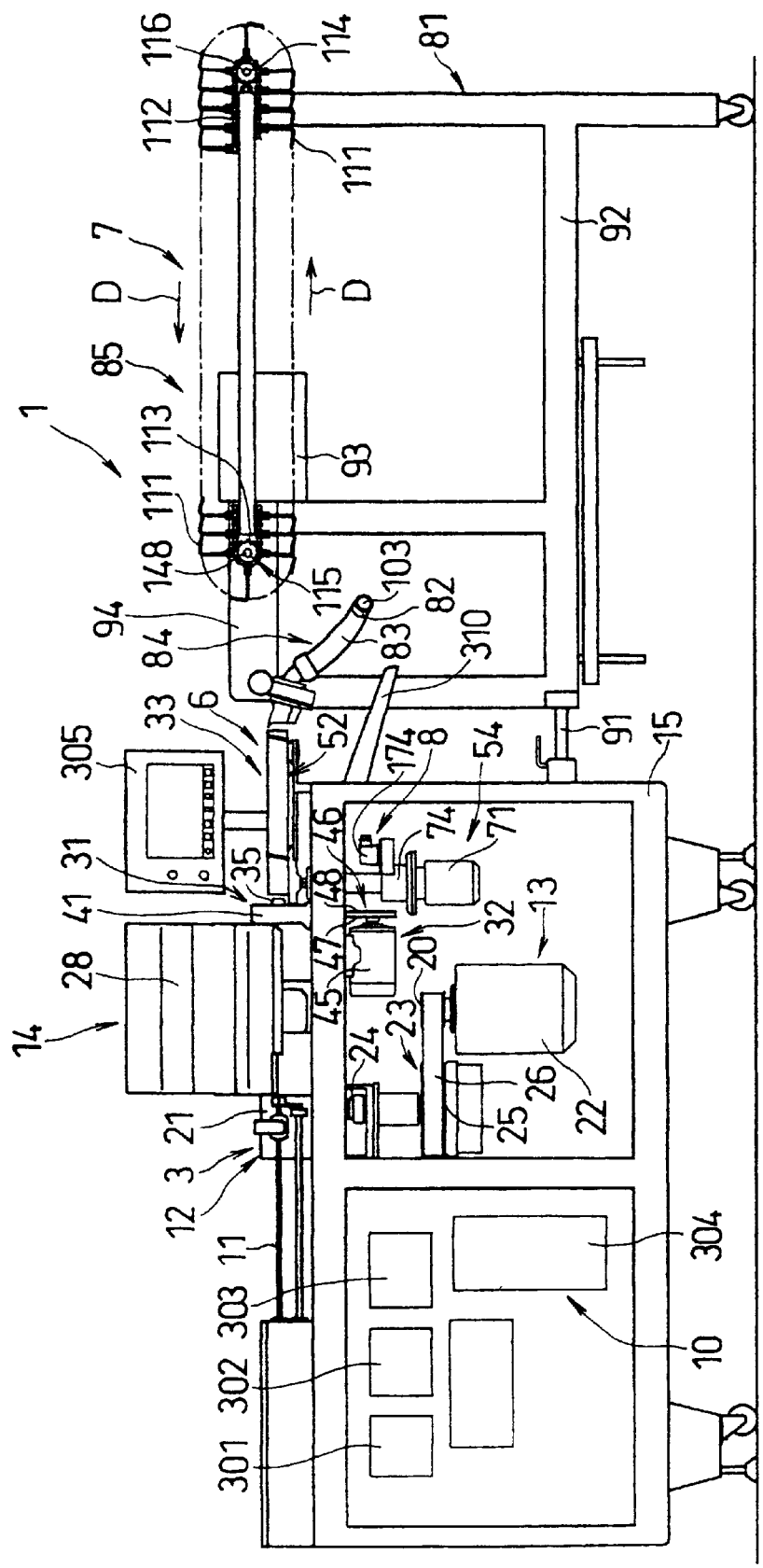
FIG. 1 is a front elevational view of a prefer red embodiment of the present invention.
Figure 2:
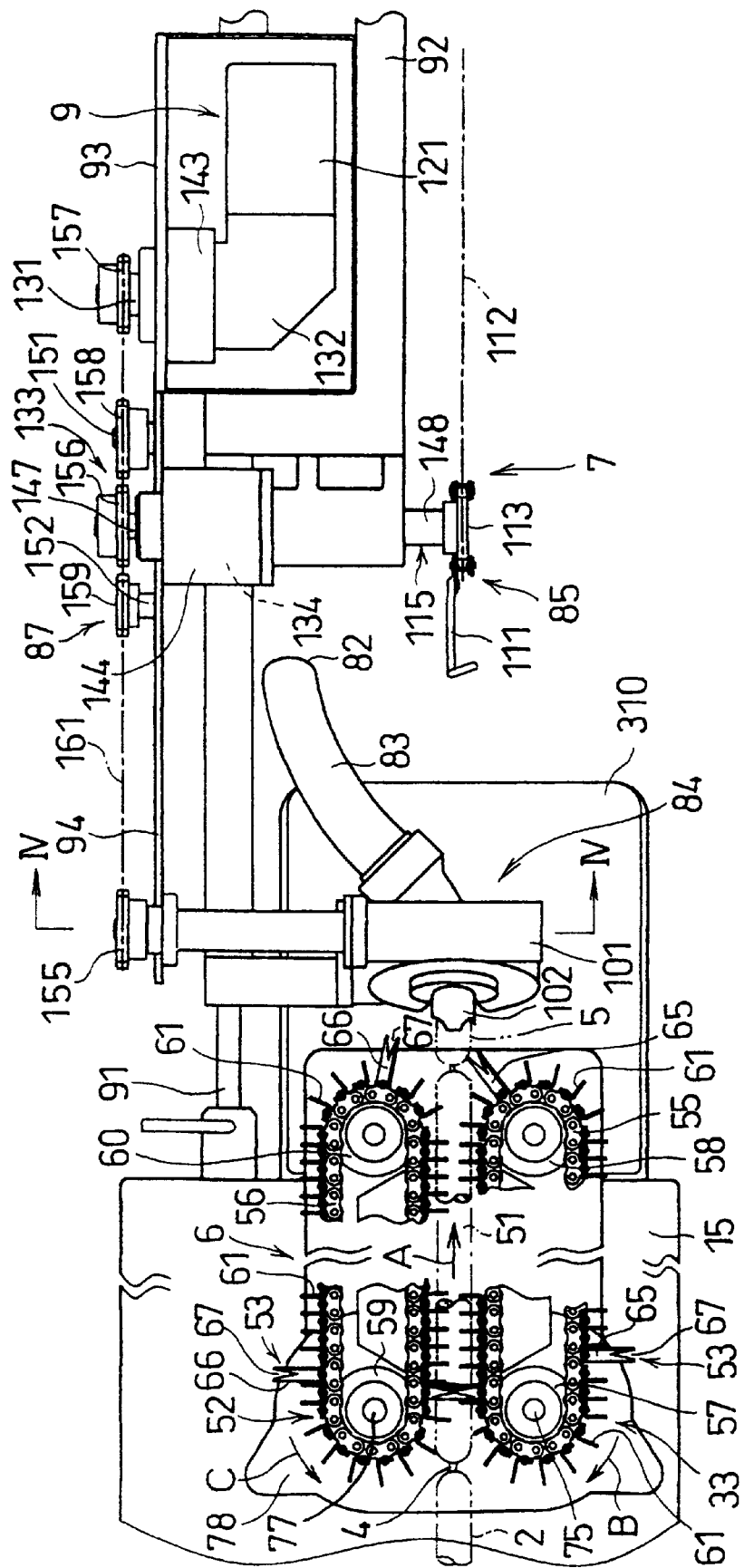
FIG. 2 is a partial plan view of the embodiment shown in FIG. 1.
Figure 3:
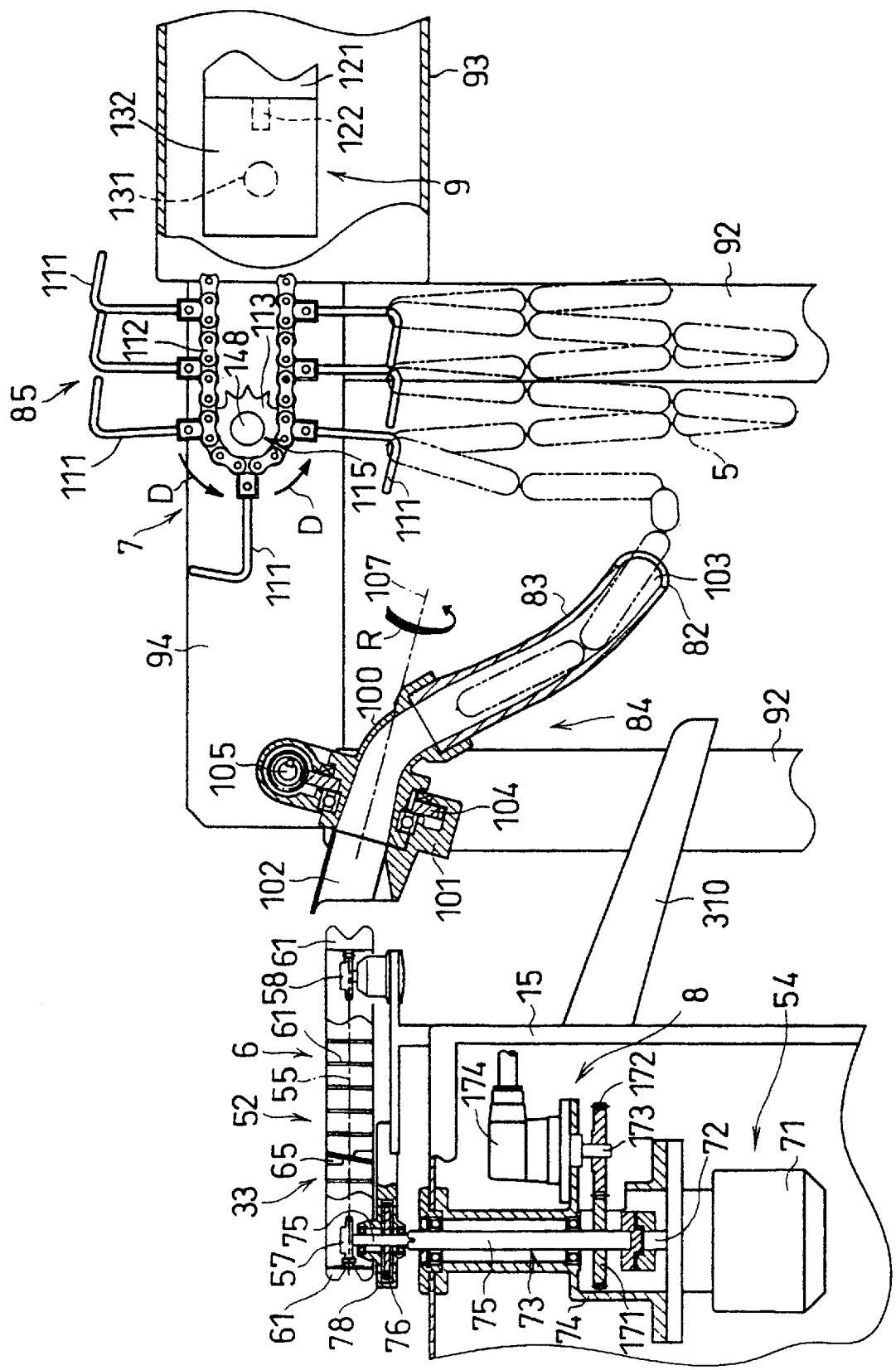
FIG. 3 is an enlarged partial front elevational view of the embodiment shown in FIG. 1.
Figure 4:
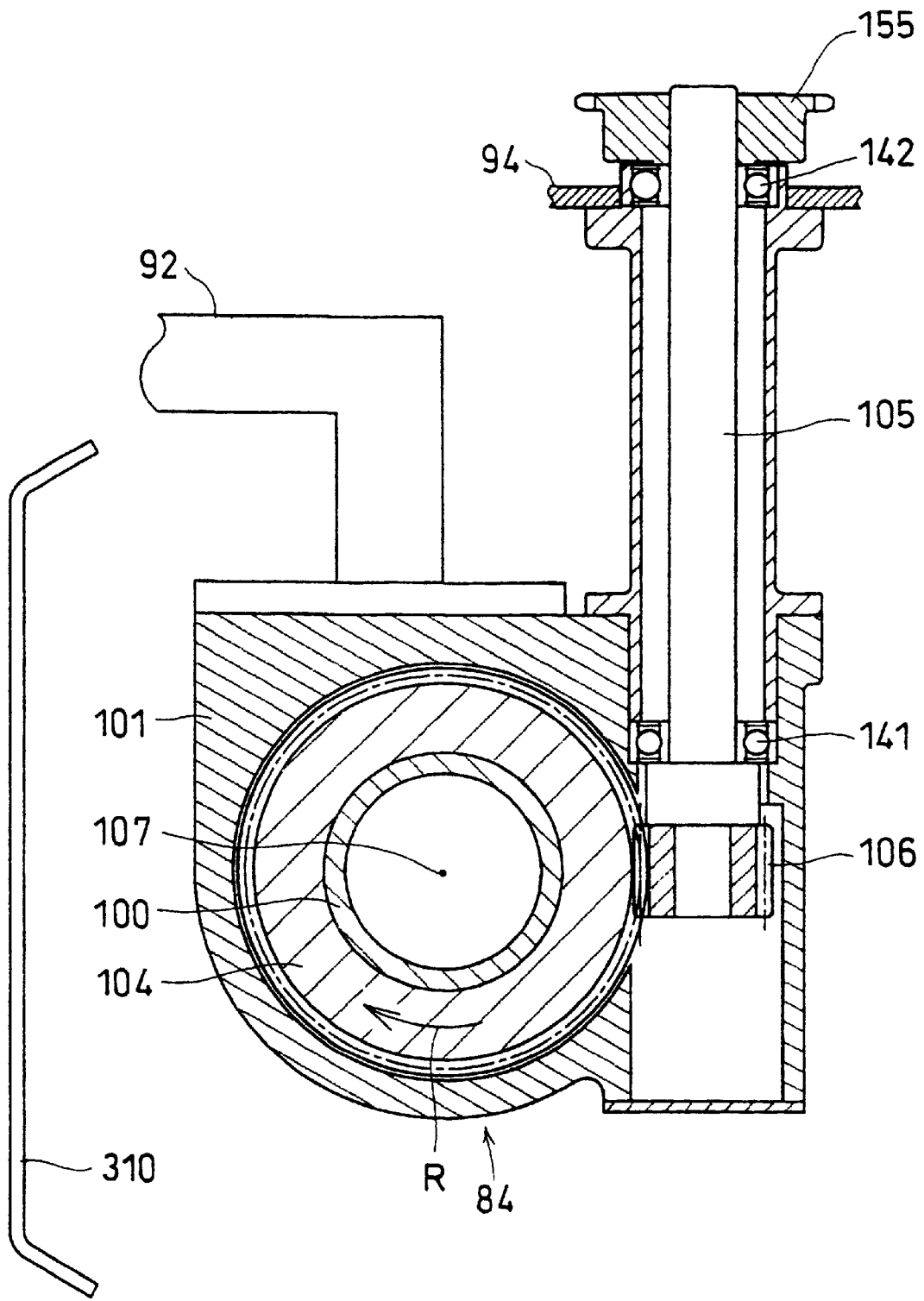
FIG. 4 is a cross-sectional view taken along line IV—IV shown in FIG. 2.
Figure 5:
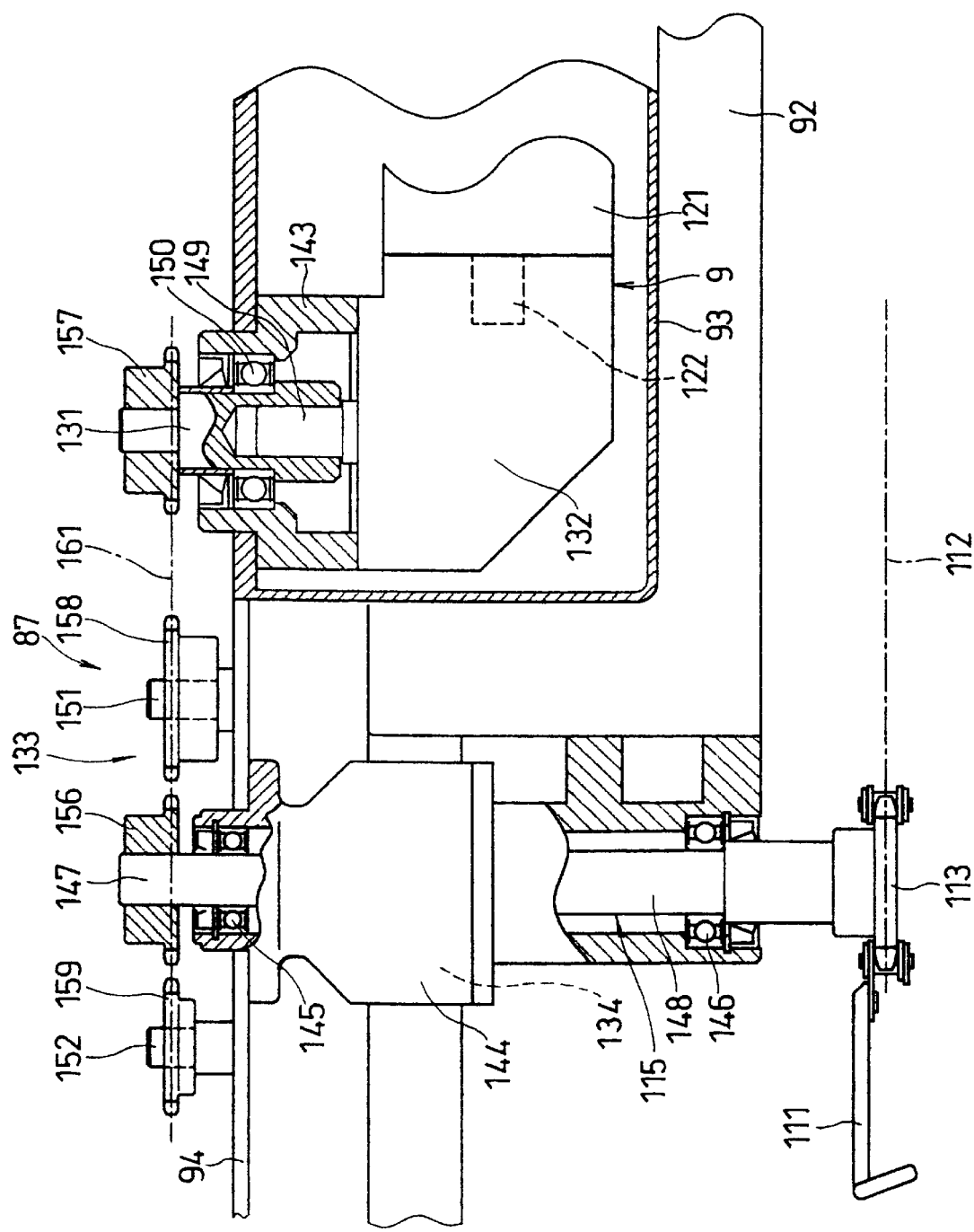
FIG. 5 is an enlarged partial plan view of the embodiment shown in FIG. 1.
Figure 6:
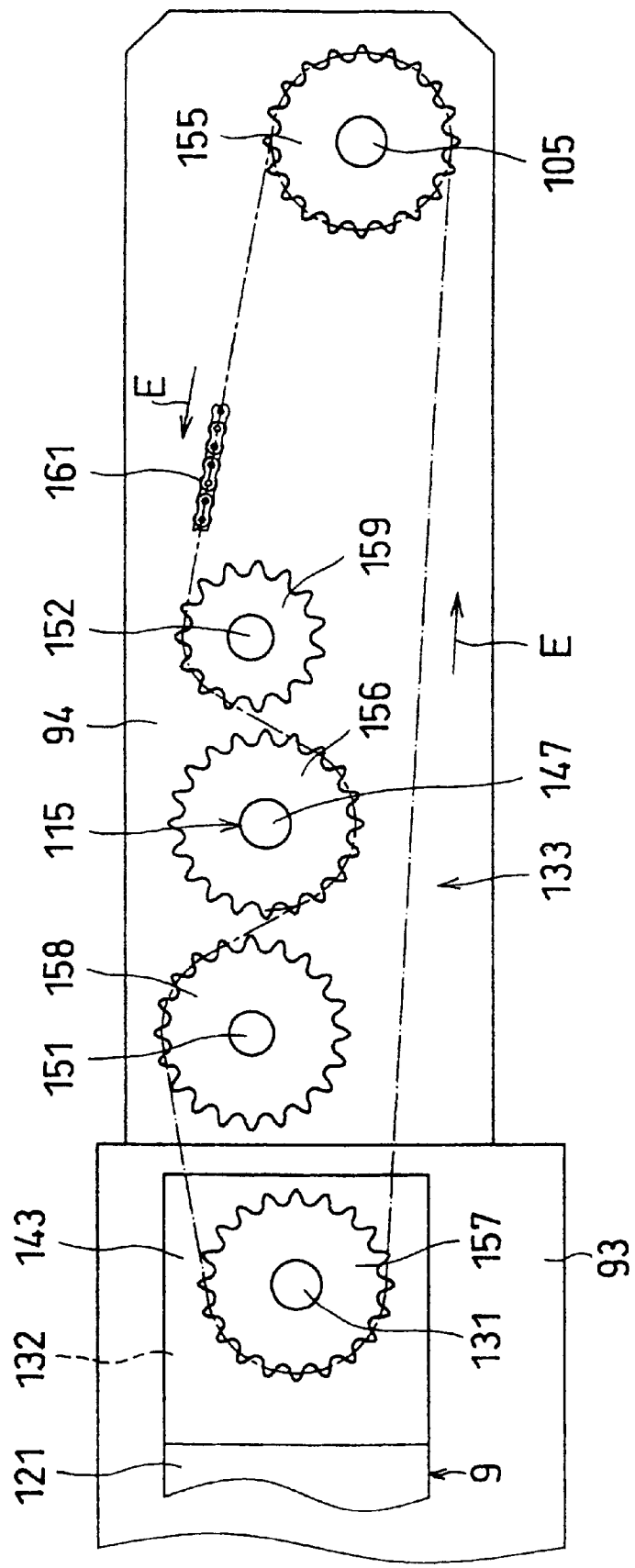
FIG. 6 is a partial rear view of the embodiment shown in FIG. 1.
Figure 7:
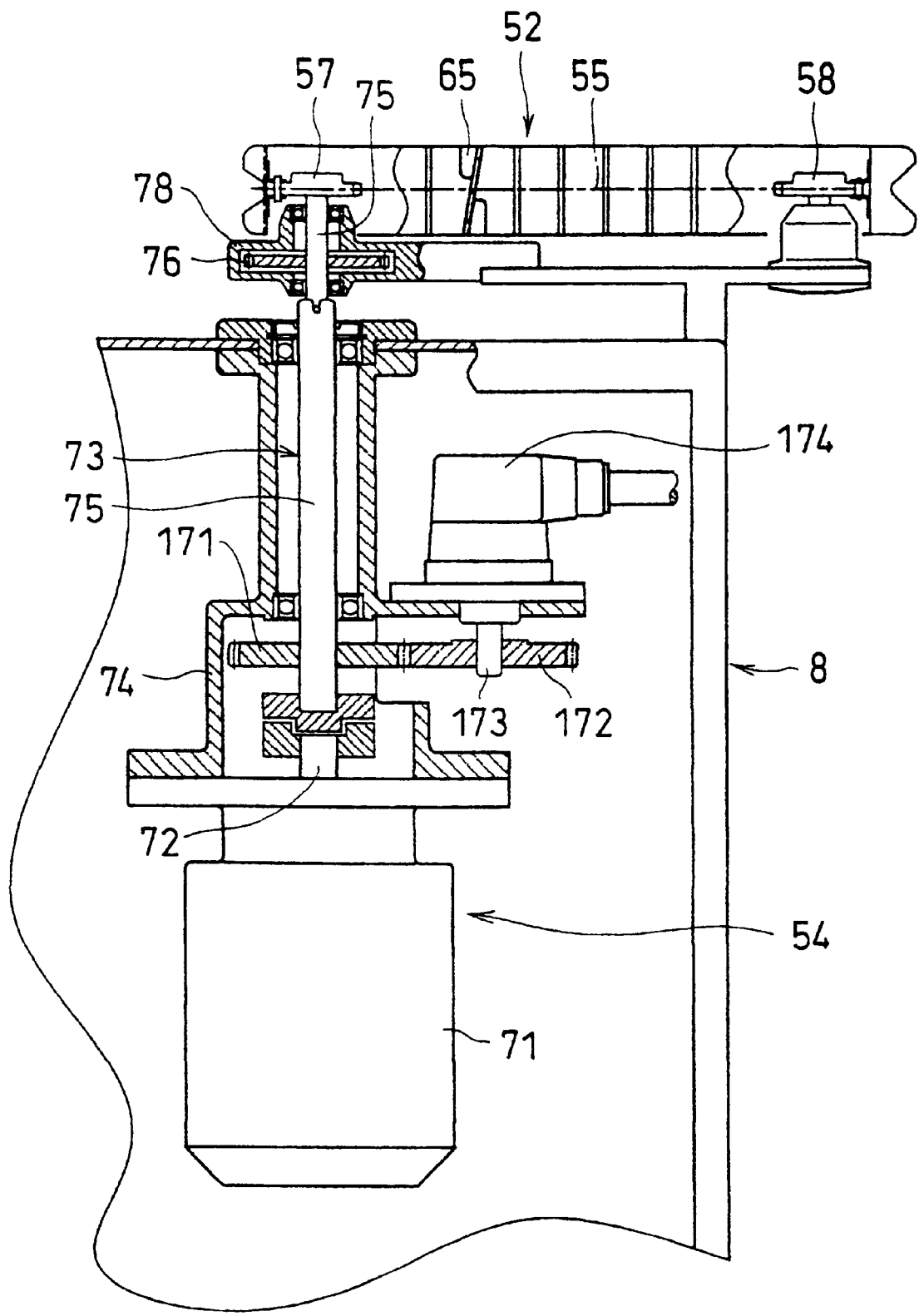
FIG. 7 is an enlarged partial front elevational view of the embodiment shown in FIG. 1.

In FIGS. 1 to 7, an apparatus 1 for manufacturing sausages, i.e., a chain of linked food products in this example, is comprised of a stuffing means 3 for stuffing a raw material for linked food products, i.e., a meat emulsion for sausages in this example into a tubular casing 2; a linking means 6 for forming the casing 2 stuffed with the meat emulsion from the stuffing means 3 into a chain of food products, i.e., sausages 5, linked via twisted portions 4, and for conveying the sausages 5; a suspending device 7 for suspending the sausages 5 conveyed and supplied from the linking means 6; a detecting means 8 for detecting the amount of sausages 5 being supplied and conveyed to the suspending device 7; and a controlling means 10 for controlling a power generating means 9 of the suspending device 7 on the basis of a detection signal from the detecting means 8.

The stuffing means 3 is provided with a stuffing nozzle 11; a stuffing pump means 12 for discharging the meat emulsion, i.e., the raw material for sausages, and supplying the same into the stuffing nozzle 11; a driving means 13 for driving the stuffing pump means 12; a casing supplying means 14 for supplying an unstuffed casing 2 shrunk in an axial direction (longitudinal direction); and a main frame 15 which is common to the linking means 6 as well.

The stuffing nozzle 11 discharges the meat emulsion from its distal end into the unstuffed casing 2 fitted over its outer surface to stuff the meat emulsion into the casing 2.

The stuffing pump means 12 is provided with a metering pump 21 which is a stuffing pump mounted on the upper surface of the main frame 15. The driving means 13 is provided with an electric motor 22 mounted within the main frame 15, a power transmitting means 23 disposed within the main frame 15 to transmit the rotation of an output rotating shaft of the motor 22 to the metering pump 21, and an inverter 301 disposed within the main frame 15.

The power transmitting means 23 is provided with a toothed pulley 20 mounted on the output rotating shaft of the motor 22, an unillustrated rotating shaft provided rotatably within the main frame 15 and connected to a metering rotor of the metering pump 21, a joint 24 attached to this rotating shaft, a toothed pulley 25 mounted on an unillustrated rotating shaft connected to the joint 24, a toothed belt 26 trained between the toothed pulleys 20 and 25, and so on. The rotation of the output rotating shaft of the motor 22 is transmitted to the metering rotor of the metering pump 21 via the toothed pulley 20, the toothed belt 26, the toothed pulley 25, the joint 24, and the unillustrated rotating shaft, and the like. As the metering rotor rotates, the metering pump 21 discharges a fixed amount of the meat emulsion continuously and supplies the same into the stuffing nozzle 11. Since the metering pump 21 and such as the mechanism of supplying the meat emulsion, i.e., the raw material of sausages, from the metering pump 21 into the stuffing nozzle 11 are publicly known, a detailed description thereof will be omitted.

The casing supplying means 14 is mounted on the upper surface of the main frame 15, has a hopper 28 for accommodating unstuffed casings 2, and is adapted to discharge the unstuffed casings 2 one at a time from a lower opening in the hopper 28. The casing 2 discharged from the lower opening in the hopper 28 is fitted over the outer surface of the stuffing nozzle 11. Since the casing supplying means 14 itself and the mechanism for fitting the casing 2 over the outer surface of the stuffing nozzle 11 are known from Japanese Patent Application Laid-Open No. 269618/1990 and the like, a detailed description thereof will be omitted.

The linking means 6 is provided with a rotation imparting means 31 for imparting rotation to the casing 2 stuffed with the meat emulsion, a driving means 32 for driving the rotation imparting means 31, a nipping and conveying means 33 for forming a twisted portion 4 in cooperation with the rotation imparting means 31 while nipping the casing 2 stuffed with the meat emulsion, and for conveying the sausages 5 formed into the chain of links via the twisted portions 4, and a driving means 54 for driving the nipping and conveying means 33.

The rotation imparting means 31 has a housing 41 mounted on the upper surface of the main frame 15 and an annular chuck 35 disposed rotatably on the housing 41. The arrangement provided is such that the distal end of the stuffing nozzle 11 over which the casing 2 is fitted is disposed inside the chuck, and an inner peripheral surface of the chuck 35 is adapted to come into contact with the outer surface of the casing 2 with the meat emulsion stuffed therein.

The driving means 32 is provided with an electric motor 45 mounted within the main frame 15, a power transmitting means 46 disposed within the main frame 15 to transmit the rotation of an output rotating shaft of the motor 45 to the chuck 35, and an inverter 302 for converting the speed of the electric motor 45.

The power transmitting means 46 is provided with a toothed pulley 47 mounted on the output rotating shaft of the motor 45, a toothed pulley (not shown) provided rotatably in the housing 41 and having the chuck 35 inserted and fitted therein, a toothed belt 48 trained between the toothed pulley having the chuck 35 inserted and fitted therein and the toothed pulley 47, and so on. The rotation of the output rotating shaft of the motor 45 is transmitted to the chuck 35 via the toothed pulley 47, the toothed belt 48, the toothed pulley having the chuck inserted and fitted therein. As the chuck 35 rotates, the chuck 35 in cooperation with the nipping and conveying means 33 rotates the casing 2 stuffed with the meat emulsion so as to produce the twisted portion 4 therein, thereby forming the sausage 5, i.e., the food product linked via the twisted portion 4 in the chain. Since the formation itself of the twist by the chuck 35 is publicly known from Japanese Patent Publication No. 27509/1965 and the like, a detailed description thereof will be omitted.

The nipping and conveying means 33 is provided with a pair of chains 55 and 56 forming a conveying passage 51 for the sausages 5 and serving as endless members juxtaposed on the main frame 15; a drive sprocket wheel 57 and a driven sprocket wheel 58 which are rotatably mounted on the main frame 15 and between which one chain 55 is trained; a drive sprocket wheel 59 and a driven sprocket wheel 60 which are rotatably mounted on the main frame 15 and between which the other chain 56 is trained; a plurality of lugs 61 attached to the respective chains 55 and 56 at equal intervals; a plurality of pincher members 65 attached to the chain 55 at equal intervals; and a plurality of pincher members 66 attached to the chain 56 at equal intervals in correspondence with the pincher members 65. Each of the pincher members 65 and 66 has a V-shaped notch 67 at its tip. When one pincher member 65 attached to the chain 55 and the pincher member 66 attached to the chain 56 and corresponding to that pincher member 65 mesh with each other during the traveling of the chains 55 and 56 in the directions B and C, the pincher members 65 and 66 pinch the casing 2 stuffed with the meat emulsion at the V-shaped notches 67 of the pair of meshing pincher members 65 and 66, and reduce the diameter of the casing 2. The conveying passage 51 is formed between the chains 55 and 56 respectively traveling in the B and C directions which are mutually opposite rotating directions. As the pincher members 65 and 66 move in the same direction (in the direction A) in the conveying passage 51 due to the traveling of the chains 55 and 56 in the directions B and C, the sausages 5 pinched by the pincher members 65 and 66 are conveyed in the direction A.

The linking means 6 is adapted to form the twisted portion 4 at the reduced-diameter portion of the casing 2 as the casing 2 stuffed with the meat emulsion is rotated by the chuck 35 of the rotation imparting means 31 and as the diameter of the casing 2 stuffed with the meat emulsion is reduced by the pair of pincher members 65 and 66.

The driving means 54 is provided with an electric motor 71 mounted within the main frame 15, a power transmitting means 73 for transmitting the rotation of an output rotating shaft 72 of the motor 71 to the drive sprocket wheels 57 and 59, and an inverter 303 for changing the speed of the electric motor 71.

The power transmitting means 73 is provided with a housing 74 attached to the main frame 15 and disposed within the main frame 15, the motor 71 being supported by the housing 74; a rotating shaft 75 which is rotatably supported by the housing 74, has one end connected to the output rotating shaft 72 and another end connected to the drive sprocket wheel 57; a housing 78 mounted on the main frame 15; a gear 76 rotatably disposed in the housing 78 and secured to the rotating shaft 75; a rotating shaft 77 supported rotatably in the housing 78 and secured to the drive sprocket wheel 59; and a gear (not shown) meshing with the gear 76 and secured to the rotating shaft 77 inside the housing 78.

The power transmitting means 73 is arranged such that as the motor 71 is operated, its output rotating shaft 72 is rotated, and this rotation is transmitted directly to the drive sprocket wheel 57 by means of the rotating shaft 75 and to the drive sprocket wheel 59 by means of the rotating shaft 75, the gear 76, the gear secured to the rotating shaft 77, and the rotating shaft 77, thereby rotating the drive sprocket wheels 57 and 59 in the mutually opposite directions. As the drive sprocket wheels 57 and 59 rotate, the chains 55 and 56 are made to travel in the directions B and C, respectively.

The suspending device 7 is provided with a device frame 81 separate from the main frame 15; a guiding means 84 provided on an upper portion of the device frame 81 and having a guide tube 83 serving as a guiding member for guiding given portions of the chain of sausages 5, which are being conveyed and supplied by the nipping and conveying means 33, to a predetermined position while circularly moving its free end 82; a conveying means 85 provided on the upper portion of the device frame 81 in the same way as the guiding means 84, and adapted to convey the sausages 5 formed into loops as the given portions of the sausages 5 guided to the predetermined position by the guide tube 83 of the guiding means 84 are caught by the conveying means 85; the aforementioned power generating means 9 which is similarly provided on the upper portion of the device frame 81 and is adapted to generate power constituting a conveying force for the sausages 5 in the conveying means 85 as well as a circularly moving force for circularly moving the guide tube 83 of the guiding means 84; and a power transmitting means 87 for transmitting the power generated by the power generating means 9 to the guide tube 83 and the conveying means 85 as the circularly moving force for the free end 82 of the guide tube 83 and the conveying force of the conveying means 85.

The device frame 81 is provided with a frame body 92 connected to the main frame 15 by means of a connecting mechanism 91 at a lower position, a housing 93 provided on an upper portion of the frame body 92, and a plate-shaped frame 94 disposed on the upper portion of the frame body 92.

The guiding means 84 is provided with a housing 101 supported by the frame body 92 of the device frame 81; a guide member 102 attached to the housing 101; a rotating tube 100 supported rotatably about its axis 107 in the housing 101 on the inlet port side adjacent to the guide member 102; the aforementioned guide tube 83 having an outlet port 103 and attached detachably to the rotating tube 100; and a large-diameter crossed helical gear 104 attached to an outer surface of the rotating tube 100. The large-diameter crossed helical gear 104 meshes with a small-diameter crossed helical gear 106 formed integrally on one end portion of a rotating horizontal shaft 105 supported rotatably in the housing 101, is rotated by means of the crossed helical gear 106 by the rotation of the rotating horizontal shaft 105, and is adapted to rotate the rotating tube 100 about its axis 107 in the R direction by that rotation. By the rotation of the rotating tube 100, the guide tube 83 is also rotated similarly. In this example, the numbers of teeth of the crossed helical gears 104 and 106 are set such that the guide tube 83 undergoes one revolution when the rotating horizontal shaft 105 undergoes four revolutions.

The guide tube 83 is curved toward its free end 82, and as the crossed helical gear 104 rotates in the direction R, the portion of the free end 82 is circularly moved similarly in the R direction about the axis 107 via the rotating tube 100. The guiding means 84 feeds out the sausages 5, which are inserted into the guide tube 83 from the nipping and conveying means 33 via the guide member 102, from the outlet port 103, and guides each given portion of the chain of sausages 5 to the predetermined position as its free end 82 is circularly moved by the rotation of the guide tube 83.

The conveying means 85 is provided with a plurality of hooks 111 whereby the given portions of the chain of sausages 5 guided by the guiding means 84 are caught; a chain 112 serving as an endless member having the hooks 111 attached thereto at equal intervals; and a drive sprocket wheel 113 and a driven sprocket wheel 114 between which the chain 112 is trained. The drive sprocket wheel 113 is mounted on a rotating horizontal shaft 115, while the driven sprocket wheel 114 is mounted on a rotating shaft 116 rotatably supported on the frame body 92. As the rotating horizontal shaft 115 is rotated, in the conveying means 85, the sprocket wheel 113 is rotated, which in turn causes the chain 112 to travel in the direction D within a vertical plane, and also causes the hooks 111 to travel in the direction D within the vertical plane. The chain of sausages 5 which are discharged from the free end 82 circularly moved about the axis 107 drops onto the hooks 111 which move from above to below with the rotating horizontal shaft 115 as the center, of rotation and is caught by the hooks 111.

The power generating means 9 is provided with an electric servo motor 121 for generating a rotating force as power, and an output rotating shaft 122 of the motor 121 is disposed in such a manner as to extend in a direction in which the output rotating shaft 122 intersects the rotating horizontal shaft 105, i.e., in a direction perpendicular to the rotating horizontal shaft 105 in this example. Thus, the power generating means 9 in this example is provided independently of the driving means 13, 32, and 54.

The power transmitting means 87 is provided with a rotating horizontal shaft 131 juxtaposed to the rotating horizontal shaft 105 and disposed rotatably; a speed reducer 132 having a bevel gear mechanism interposed between the rotating horizontal shaft 131 and the output rotating shaft 122 of the electric motor 121 to transmit the rotation of the output rotating shaft 122 of the electric motor 121 to the rotating horizontal shaft 131; the aforementioned rotating horizontal shaft 105 connected to the guide tube 83 via the rotating tube 100, the large-diameter crossed helical gear 104, and the small-diameter crossed helical gear 106 and disposed rotatably on the upper portion of the device frame 81, so as to transmit the rotating force from the electric motor 121 to the guide tube 83 and circularly move the free end 82 of the guide tube 83; the aforementioned rotating horizontal shaft 115 disposed rotatably on the upper portion of the device frame 81 and connected to the chain 112 via the sprocket wheel 113, so as to transmit the rotating force from the electric motor 121 to the chain 112 serving as the endless member and cause the chain 112 to travel in the direction D; a wrapping connector mechanism 133 for rotating the rotating horizontal shafts 105, 115, and 131 in synchronism with each other; and a speed reducer 134.

The rotating horizontal shaft 105 is rotatably disposed in the housing 101, which is mounted on the frame body 92 as described above, via bearings 141 and 142.

The speed reducer 132 arranged integrally with the electric motor 121 is disposed in the housing 93 mounted on the frame body 92, and the rotating horizontal shaft 131 connected to an output shaft 149 of the speed reducer 132 is supported rotatably via a bearing 150 by a flange 143 fixed to the housing 93. The housing 93 for accommodating the electric motor 121 and the speed reducer 132 which are formed integrally has a waterproof structure.

The rotating horizontal shaft 115 is provided with an input shaft 147 and an output shaft 148 which are respectively supported rotatably by bearings 145 and 146 in a housing 144 mounted on the frame body 92. The sprocket wheel 113 is secured to the output shaft 148. The input shaft 147 an the output shaft 148 are coupled to each other via the speed reducer 134.

The wrapping connector mechanism 133 is provided with sprocket wheels 155, 156, and 157 serving as wheels respectively secured to the rotating horizontal shaft 105, the input shaft 147 of the rotating horizontal shaft 115, and the rotating horizontal shaft 131; idle sprocket wheels 158 and 159 respectively supported rotatably by horizontal shafts 151 and 152 provided on the plate-shaped frame 94; and a chain 161 serving as an endless member wrapped around and in meshing engagement with the sprocket wheels 155 to 159, respectively. In the wrapping connector mechanism 133, when the rotating horizontal shaft 131 is rotated by the operation of the electric motor 121, the sprocket wheel 157 is rotated. The rotation of the sprocket wheel 157 in turn causes the chain 161 to travel in the direction E, with the result that the sprocket wheels 155, 156, 158, and 159 are also rotated. In this example, the numbers of teeth of the sprocket wheels 155, 156, and 157 are made identical so that these three sprocket wheels rotate at the same number of revolutions.

The speed reducer 134 is disposed in the housing 144, and is interposed between the input shaft 147 and the output shaft 148 so as to transmit the rotation of the input shaft 147 after reducing the rotating speed of the input shaft 147. In this example, a planetary gear mechanism in which the input shaft 147 and the output shaft 148 are disposed concentrically is used as the speed reducer 134, and a ratio of 1:16 is adopted as its speed reduction ratio so that the sprocket wheel 113 rotates by a ¼ turn at one rotation of the guide tube 83.

The power transmitting means 87 is arranged such that as the electric motor 121 is operated, the rotation of its output rotating shaft 122 is transmitted to the rotating horizontal shaft 131 via the speed reducer 132 having the bevel gear mechanism, the rotation of the rotating horizontal shaft 131 is transmitted to the rotating horizontal shaft 105 and the input shaft 147 of the rotating horizontal shaft 115 by means of the wrapping connector mechanism 133 so as to rotate the rotating horizontal shaft 105 and the input shaft 147, the rotation of the rotating horizontal shaft 105 is transmitted to the guide tube 83 via the small-diameter crossed helical gear 106 and the large-diameter crossed helical gear 104 so as to rotate the guide tube 83, and the rotation of the input shaft 147 is transmitted to the chain 112 via the speed reducer 134, the output shaft 148, and the sprocket wheel 113 so as to cause the chain 112 to travel in the direction D.

The detecting means 8 is provided with a gear 171 secured to the rotating shaft 75, a gear 172 meshing with the gear 171, and a pulse generator 174 mounted on the housing 74 and having a rotating shaft 173 to which the gear 172 is secured. The detecting means 8 is adapted to generate pulses corresponding to the amount of rotation of the rotating shaft 75 as the rotating shaft 173 is rotated by the rotation of the rotating shaft 75 via the gears 171 and 172. The number of pulses generated by the pulse generator 174 of the detecting means 8 corresponds to the amount of movement of the chain 55, and hence corresponds to the amount of conveyance of the sausages 5 by the conveying means 52.

The controlling means 10 is provided with a motor controller 304 for controlling the electric motor 121 of the power generating means 9 on the basis of the detection signal from the detecting means 8, such that predetermined portions of the sausages 5 for constituting predetermined numbers of links, respectively, are consecutively caught by the respective hooks 111 of the conveying means 85 by means of the guide tube 83, and loops of the sausages 5 each having the predetermined number of links are respectively formed between adjacent ones of the hooks 111. For example, if "four" is set as the number of links per loop through an operating and setting panel 305, the controlling means 10 receives pulses from the pulse generator 174 of the detecting means 8, and causes the electric motor 121 to operate intermittently or continuously so as to rotate the guide tube 83 one revolution and concurrently rotate the sprocket wheel 113 a ¼ revolution each time four links in the chain of sausages 5 are conveyed by the nipping and conveying means 33 and fed out from the guide tube 83.

It should be noted that, in this example, the housing 101 of the guiding means 84 is mounted on the frame body 92 located away from the axis 107 laterally in the horizontal direction. Further, a chute 310 attached to the main frame 15 and projecting toward the suspending device 7 is provided below the housing 101. The meat emulsion which ruptured during the formation of links and jumped out from inside the casing 2 is received by the chute 310, thereby preventing the contamination of the floor on which the manufacturing apparatus 1 is installed.

With the above-described suspending device 7 of the apparatus 1 for manufacturing a chain of linked food products such as sausages, since the wrapping connector mechanism 133 and the rotating horizontal shafts 105 and 115 are provided on the upper portion of the device frame 81, even if the casing 2 of the sausages 5 is ruptured, and its internal meat emulsion is scattered, the risk of the meat emulsion becoming attached to the wrapping connector mechanism 133 and the rotating horizontal shafts 105 and 115 is very small. In addition, since the wrapping connector mechanism 133 and the rotating horizontal shafts 105 and 115 are provided in a compact arrangement, cleaning can be effected easily.

Instead of the above-described guiding means 84, it is possible to use the guiding means disclosed in, for instance, Japanese Patent Application Publication No. 5899/1966, the publication of Japanese Patent Application Laid-Open No. 227874/1993 or U.S. Pat. No. 3,694,853.

Figure 8:
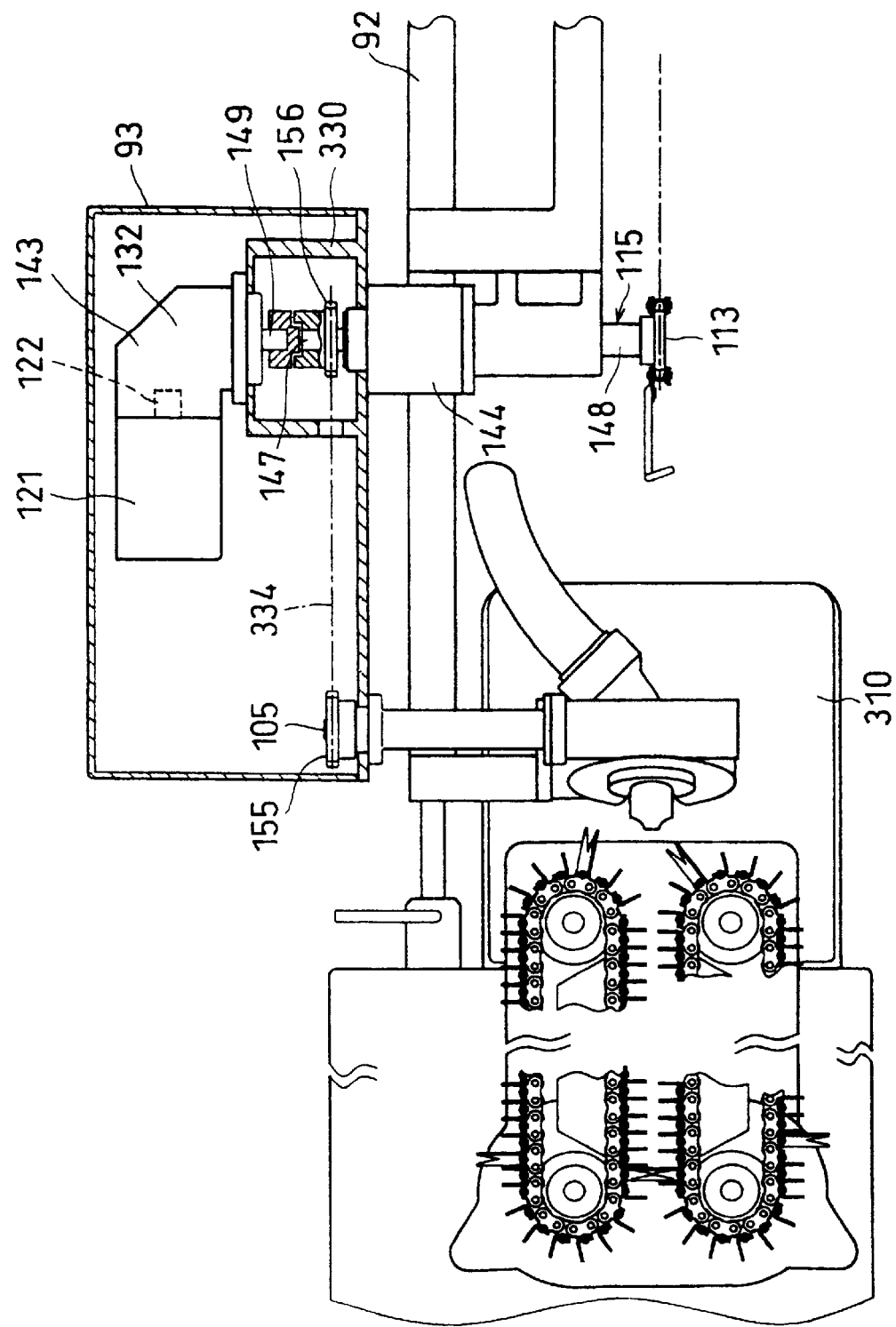
FIG. 8 is an enlarged partial plan view of another preferred embodiment of the present invention.

It should be noted that although, in the above-described example, the rotation of the output rotating shaft 122 of the electric motor 121 is transmitted to the rotating horizontal shafts 105 and 115 via the speed reducer 132, the rotating horizontal shaft 131, and the chain 161, an arrangement may be provided such that, as shown in FIG. 8, the speed reducer 132 arranged integrally with the electric motor 121 is mounted on a bracket 330 within the housing 93 disposed on the upper portion of the frame body 92, the output rotating shaft 149 of the speed reducer 132 is directly coupled with the input shaft 147 of the rotating horizontal shaft 115, and a chain 334 is trained between the sprocket wheel 156 secured to the input shaft 147 and the sprocket wheel 155 secured to the rotating horizontal shaft 105, so as to transmit the rotation of the output shaft 122 of the electric motor 121 to the rotating horizontal shafts 105 and 115.

Figure 9:
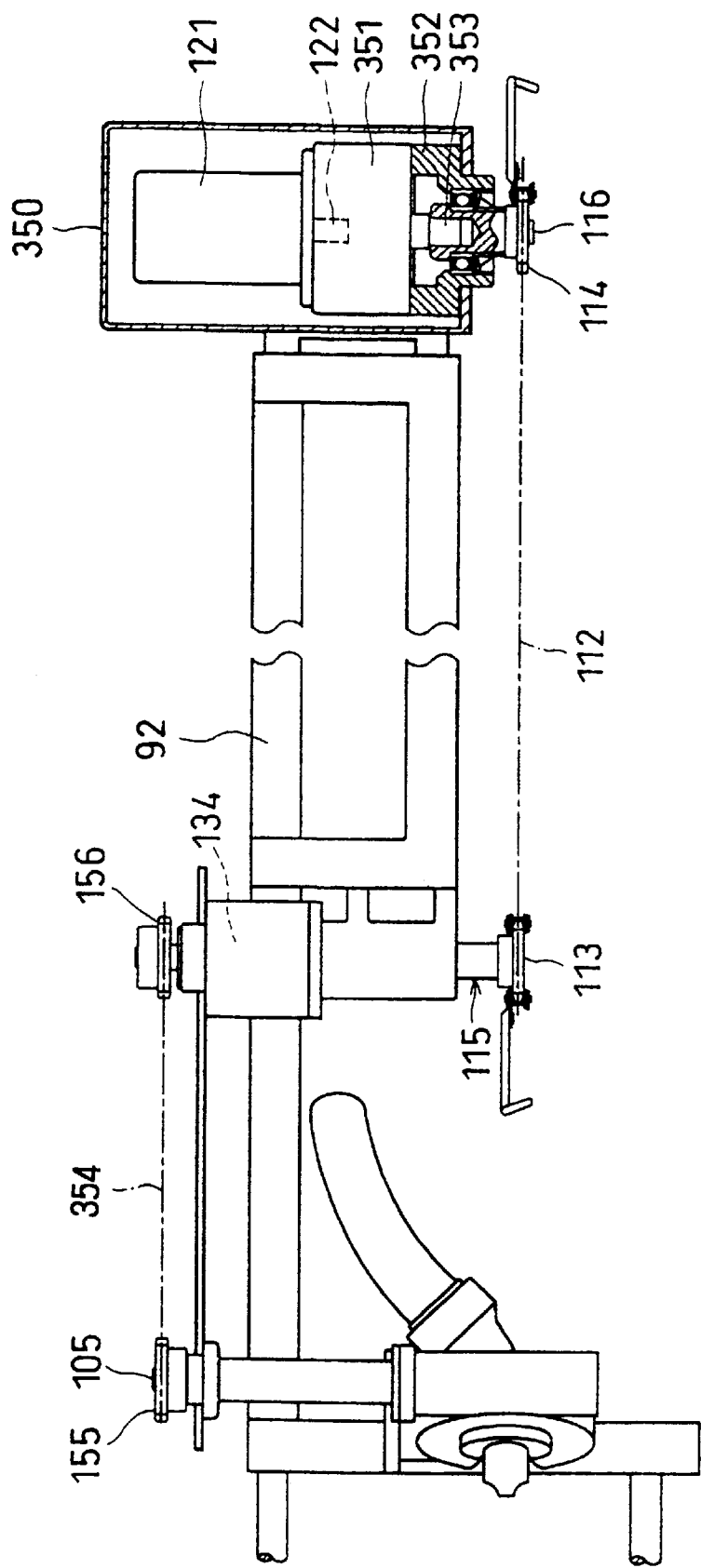
FIG. 9 is an enlarged partial plan view of still another preferred embodiment of the present invention.

Further, as shown in FIG. 9, an arrangement may be provided such that a speed reducer 351 arranged integrally with the electric motor 121 is mounted on a flange 352 within a housing 350 disposed on the upper portion of the frame body 92, an output rotating shaft 353 of the speed reducer 351 is directly coupled with the rotating shaft 116, and the rotating force of the output rotating shaft 122 of the electric motor 121 is transmitted to the rotating horizontal shaft 115 via the chain 112, and the rotation of the rotating horizontal shaft 115 is transmitted to the rotating horizontal shaft 105 via a chain 354 equivalent to the chain 334. In this case, the rotating horizontal shaft 116 constitutes the rotating horizontal shaft, the rotating horizontal shaft 115, the sprocket wheels 155 and 156, and the chain 354 constitute the wrapping connector mechanism, and the speed reducer 134 formed by a planetary gear mechanism functions as a speed increaser.

In addition, the pulley 155, 156, or 114 may be mounted directly on the output rotating shaft 122 of the electric motor 121, in which case the output rotating shaft 122 constitutes the rotating horizontal shaft. Further, by using a geared motor as the electric motor 121, the pulley 155, 156, or 114 may be mounted directly on the output rotating shaft of the geared motor, in which case, the output rotating shaft of the geared motor constitutes the rotating horizontal shaft. Further, the output rotating shaft 122 of the electric motor 121 may be coupled with the rotating horizontal shaft 105 or 115 or the rotating horizontal shaft 116 constituting the rotating horizontal shaft via a coupling.

Figure 10:
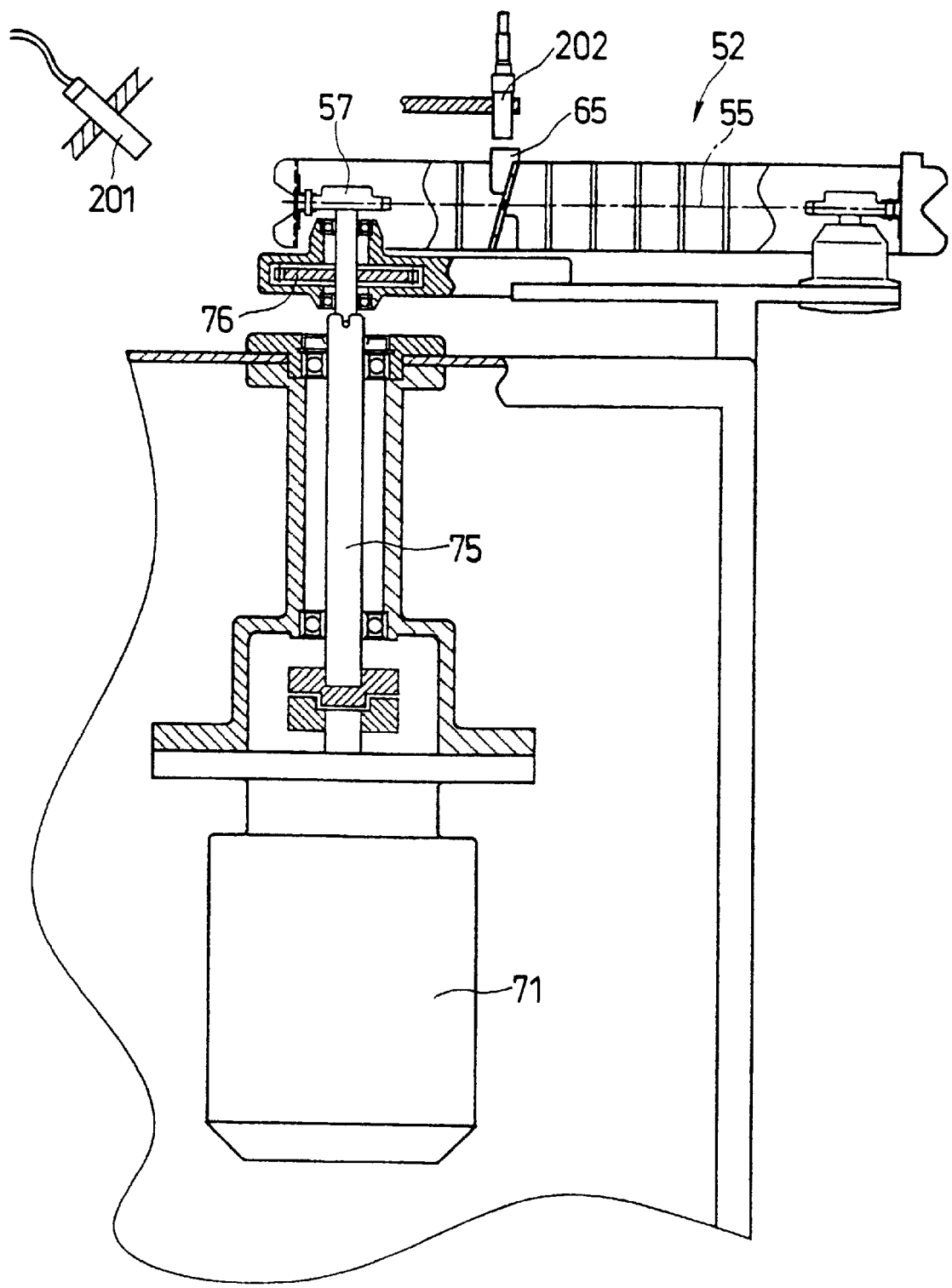
FIG. 10 is an enlarged partial front elevational view of a further preferred embodiment of the present invention.
Figure 11:
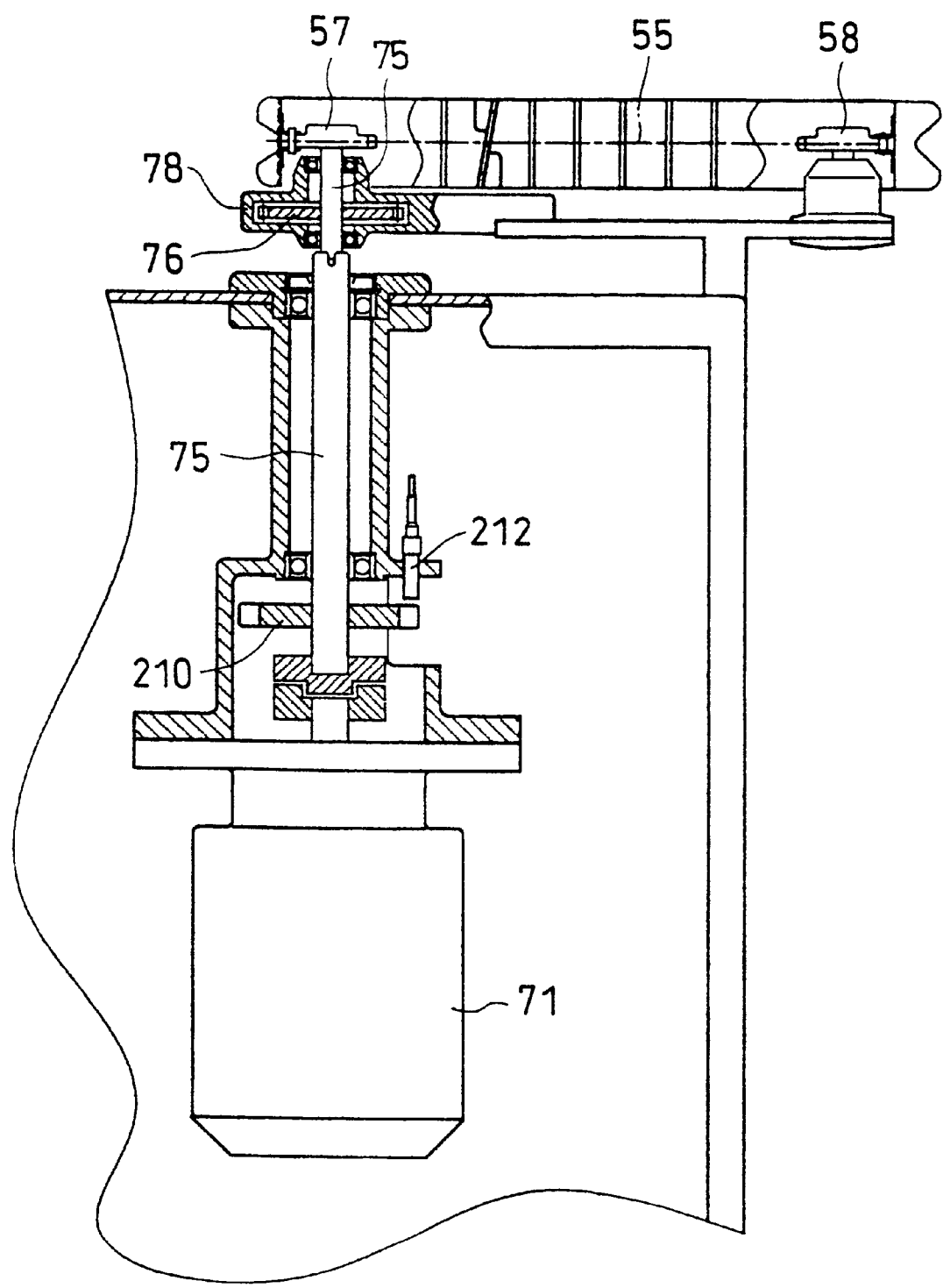
FIG. 11 is an enlarged partial front elevational view of a still further preferred embodiment of the present invention.

Instead of the detecting means 8 being formed by the gears 171 and 172 and the pulse generator 174, the detecting means 8 may be formed by an optical fiber photosensor 201 for detecting the passage of the pincher member 65, or a proximity sensor 202 in place of it, as shown in FIG. 10. Further, as shown in FIG. 11, the detecting means 8 may be formed by a toothed wheel 210 secured to the rotating shaft 75 and a proximity sensor 212 for detecting the passage of the tooth 211 of the wheel 210.

What is claimed is:

1. A suspending device for suspending a chain of linked food products, comprising:

a device frame;

guiding means on an upper portion of said device frame and having a guide member for guiding portions of the chain of linked food products to a predetermined position while circularly moving a free end thereof;

conveying means on the upper portion of said device frame, and adapted to convey the chain of linked food products formed into loops as the chain of linked food product portions guided to the predetermined position by said guide member are caught by said conveying means;

power generating means on the upper portion of said device frame and adapted to generate power constituting a conveying force for the chain of linked food products on said conveying means and a circularly moving force for circularly moving said guide member; and power transmitting means on the upper portion of said device frame and adapted to transmit the power generated by said power generating means to said guide member and said conveying means as the circularly moving force for the free end of said guide member and the conveying force of said conveying means;

said conveying means including a plurality of hooks whereby the chain of linked food product portions are caught, and an endless member to which said hooks are attached for conveying the chain of linked food products portion caught by said hooks;

said power transmitting means including a first rotatable horizontal shaft connected to said guide member and disposed rotatably on the upper portion of said device frame so as to transmit the power from said power generating means to said guide member and circularly move the free end of said guide member, a second rotatable horizontal shaft connected to said endless member and disposed rotatably on the upper portion of said device frame for transmitting the power from said power generating means to said endless member and causing said endless member to convey the chain of linked food product portions caught by said hooks, and a wrapping connector mechanism for synchronously rotating said first and said second rotatable horizontal shafts; and said first rotatable horizontal shaft having an input horizontal shaft and an output horizontal shaft, and said power transmitting means having a speed change gear interposed between said input horizontal shaft and said output horizontal shaft.

2. A suspending device for suspending a chain of linked food products according to claim 1, wherein said speed change gear is a speed increasing gear.

3. A suspending device for suspending a chain of linked food products, comprising:

a device frame;

guiding means on an upper portion of said device frame and having a guide member for guiding portions of the chain of linked food products to a predetermined position while circularly moving a free end thereof;

conveying means on the upper portion of said device frame, and adapted to convey the chain of linked food products formed into loops as the chain of linked food product portions guided to the predetermined position by said guide member are caught by said conveying means;

power generating means on the upper portion of said device frame and adapted to generate power constituting a conveying force for the chain of linked food products on said conveying means and a circularly moving force for circularly moving said guide member;

power transmitting means on the upper portion of said device frame and adapted to transmit the power generated by said power generating means to said guide member and said conveying means as the circularly moving force for the free end of said guide member and the conveying force of said conveying means;

said conveying means including a plurality of hooks whereby the chain of linked food product portions are caught, and an endless member to which said hooks are attached for conveying the chain of linked food product portions caught by the hooks;

said power transmitting means including a first rotatable horizontal shaft connected to said guide member and disposed rotatably on the upper portion of said device frame so as to transmit the power from said power generating means to said guide member and circularly move the free end of said guide member, a second rotatable horizontal shaft connected to said endless member and disposed rotatably on the upper portion of said device frame for transmitting the power from said power generating means to said endless member and causing said endless member to convey the chain of linked food product portions caught by said hooks, and a wrapping connector mechanism for synchronously rotating said first and second rotatable horizontal shafts; and said second rotatable horizontal shaft having an input horizontal shaft and an output horizontal shaft, and said power transmitting means having a speed change gear interposed between said input horizontal shaft and said output horizontal shaft.

4. A suspending device for suspending a chain of linked food products according to claim 3, wherein said speed change gear is a speed reducing gear.

5. A suspending device for suspending a chain of linked food products, comprising:

a device frame;

guiding means on an upper portion of said device frame and having a guide member for guiding portions of the chain of linked food products to a predetermined position while circularly moving a free end thereof;

conveying means on the upper portion of said device frame, and adapted to convey the chain of linked food products formed into loops as the chain of linked food product portions guided to the predetermined positions by said guide member are caught by said conveying means;

power generating means on the upper portion of said device frame and adapted to generate power constituting a conveying force for the chain of linked food products on said conveying means and a circularly moving force for circularly moving said guide member; and power transmitting means on the upper portion of said device frame and adapted to transmit the power generated by said power generating means to said guide member and said conveying means as the circularly moving force for the free end of said guide member and the conveying force of said conveying means;

said conveying means including a plurality of hooks whereby the chain of linked food product portions are caught, and an endless member to which said hooks are attached for conveying the chain of linked food product portions caught by said hooks;

said power transmitting means including a first rotatable horizontal shaft connected to said guide member and disposed rotatably on the upper portion of said device frame so as to transmit the power from said power generating means to said guide member and circularly move the free end of said guide member, a second rotatable horizontal shaft connected to said endless member and disposed rotatably on the upper portion of said device frame for transmitting the power from said power generating means to said endless member and causing said endless member to convey the chain of linked food product portions caught by said hooks, and a wrapping connector mechanism for synchronously rotating said first and said second rotatable horizontal shafts; and said power generating means including an electric motor, an output rotatable shaft of said electric motor extending in a direction to intersect said first rotatable horizontal shaft, said power transmitting means further including a third rotatable horizontal shaft juxtaposed to said first rotatable horizontal shaft and a gear mechanism interposed between said third rotatable shaft and said output rotatable shaft of said electric motor to transmit the rotation of said output rotatable shaft of said electric motor to said third rotatable horizontal shaft.

6. A suspending device for suspending a chain of linked food products, comprising:

a device frame;

guiding means on an upper portion of said device frame and having a guide member for guiding portions of the chain of linked food products to a predetermined position while circularly moving a free end thereof;

conveying means on the upper portion of said device frame, and adapted to convey the chain of linked food products formed into loops as the chain of linked food product portions guided to the predetermined position by said guide member are caught by said conveying means;

power generating means on the upper portion of said device frame and adapted to generate power constituting a conveying force for the chain of linked food products on said conveying means and a circularly moving force for circularly moving said guide member of said guiding means; and power transmitting means on the upper portion of said device frame and adapted to transmit the power generated by said power generating means to said guide member and said conveying means as the circularly moving force for the free end of said guide member and the conveying force of said conveying means;

said conveying means including a plurality of hooks whereby the chain of linked food product portions are caught, and an endless member to which said hooks are attached for conveying the chain of linked food product portions caught by said hooks;

said power transmitting means including a first rotatable horizontal shaft connected to said guide member and disposed rotatably on the upper portion of said device frame so as to transmit the power from said power generating means to said guide member and circularly move the free end of said guide member, a second rotatable horizontal shaft connected to said endless member and disposed rotatably on the upper portion of said device frame for transmitting the power from said power generating means to said endless member and causing said endless member to convey the chain of linked food product portions caught by said hooks, and a wrapping connector mechanism for synchronously rotating said first and said second rotatable horizontal shafts; and said wrapping connector mechanism including a first wheel mounted on said first rotatable horizontal shaft, a second wheel mounted on said second rotatable horizontal shaft, and an endless member trained between said first and said second wheels.

7. A suspending device for suspending a chain of linked food products, comprising:

a device frame;

guiding means on an upper portion of said device frame and having a guide member for guiding portions of the chain of linked food products to a predetermined position while circularly moving a free end thereof about an axis;

conveying means on the upper portion of said device frame, and adapted to convey the chain of linked food products formed into loops as the chain of linked food product portions guided to the predetermined position by said guide member are caught by said conveying means;

power generating means on the upper portion of said device frame and adapted to generate power constituting a conveying force for the chain of linked food products on said conveying means and a circularly moving force for circularly moving said guide member;

power transmitting means on the upper portion of said device frame and adapted to transmit the power generated by said power generating means to said guide member and said conveying means as the circularly moving force for the free end of said guide member and the conveying force of said conveying means;

said conveying means including a plurality of hooks whereby the chain of linked food product portions are caught, and an endless member to which said hooks are attached for conveying the chain of linked food product portions caught by said hooks;

said power transmitting means including a first rotatable horizontal shaft connected to said guide member and disposed rotatably on the upper portion of said device frame so as to transmit the power from said power generating means to said guide member and circularly move the free end of said guide member, a second rotatable horizontal shaft connected to said endless member and disposed rotatably on the upper portion of said device frame for transmitting the power from said power generating means to said endless member and causing said endless member to convey the chain of linked food product portions caught by said hooks, and a wrapping connector mechanism for synchronously rotating said first and said second rotatable horizontal shafts; and said wrapping connector mechanism being disposed horizontally laterally outside a circular movement locus of said free end of said guide member about said axis, and being disposed within a housing.

8. A suspending device for suspending a chain of linked food products according to claim 7, wherein said first rotating horizontal shaft has an input horizontal shaft and an output horizontal shaft, and said power transmitting means has a speed change gear interposed between said input horizontal shaft and said output horizontal shaft.

9. A suspending device for suspending a chain of linked food products according to claim 8, wherein said speed change gear is a speed increasing gear.

10. A suspending device for suspending a chain of linked food products according to claim 9, wherein said second rotatable horizontal shaft has an input horizontal shaft and an output horizontal shaft, and said power transmitting means having a speed change gear interposed between said input horizontal shaft and said output horizontal shaft.

11. A suspending device for suspending a chain of linked food products according to claim 10, wherein said speed change gear is a speed reducing gear.

12. A suspending device for suspending a chain of linked food products according to claim 7, wherein said power generating means includes an electric motor, an output rotatable shaft of said electric motor extending in a direction to intersect said first rotatable horizontal shaft, said power transmitting means further including a third rotatable horizontal shaft juxtaposed to said first rotatable horizontal shaft and a gear mechanism interposed between said third rotatable horizontal shaft and said output rotatable shaft of said electric motor to transmit the rotation of said output rotatable shaft of said electric motor to said third rotatable horizontal shaft.

13. A suspending device for suspending a chain of linked food products according to claim 7, wherein said power generating means includes an electric motor, an output rotatable shaft of said electric motor being disposed concentrically with said first or second rotatable horizontal shaft.

14. A suspending device for suspending a chain of linked food products according to claim 7, wherein said power generating means includes an electric motor, an output rotatable shaft of said electric motor being juxtaposed to said first or said second rotatable horizontal shaft.

15. A suspending device for suspending a chain of linked food products according to claim 7, wherein said wrapping connector mechanism includes a first wheel mounted on said first rotating horizontal shaft, a second wheel mounted on said second rotatable horizontal shaft, and an endless member trained between said first and said second wheels.

16. An apparatus for manufacturing a chain of linked food products, comprising:

stuffing means for stuffing a raw material for linked food products into a tubular casing;

linking means for forming the casing stuffed with the raw material into a chain of linked food products having twisted portions and for conveying the linked food products;

a suspending device according to claim 7 for suspending the chain of linked food products being conveyed and supplied by said linking means;

detecting means for detecting an amount of the chain of linked food products being conveyed and supplied to said suspending device; and controlling means for controlling a power generating means on the basis of a detection signal from said detecting means.

17. An apparatus for manufacturing a chain of linked food products according to claim 16, wherein said controlling means controls said power generating means on the basis of a detection signal generated by said detecting means such that predetermined portions of the chain of linked food products for constituting predetermined numbers of links, respectively, are consecutively caught by said hooks of said conveying means.

18. An apparatus for manufacturing a chain of linked food products according to claim 16, wherein said stuffing means includes a stuffing pump means for discharging the raw material for linked food products and first driving means for driving said stuffing pump means, said linking means being provided with rotation imparting means for imparting rotation to the casing stuffed with the raw material for linked food products, second driving means for driving said rotation imparting means, nipping and conveying means for nipping the casing stuffed with the raw material for linked food products to form twisted portions in the stuffed casing in cooperation with said rotation imparting means, and for conveying the chain of linked food products linked via the twisted portions, and third driving means for driving said nipping and conveying means, said first, said second, and said third driving means being provided independently of said power generating means.

* * * * *

UNITED STATES PATENT AND TRADEMARK OFFICE
CERTIFICATE OF CORRECTION

PATENT NO. : 6,071,186
DATED : June 6, 2000
INVENTOR(S) : Shibata et al.

It is certified that error appears in the above-identified patent and that said Letters Patent is hereby corrected as shown below:

Column 12,
Line 61, "products portion" should be read as -- product portions --.

Column 16,
Line 37, "claim 9" should be read as -- claim 7 --.

Signed and Sealed this

Twenty-fifth Day of September, 2001

Attest:

*Nicholas P. Godici*

NICHOLAS P. GODICI
*Attesting Officer*    *Acting Director of the United States Patent and Trademark Office*